INVENTOR
MERLE F. SHARP

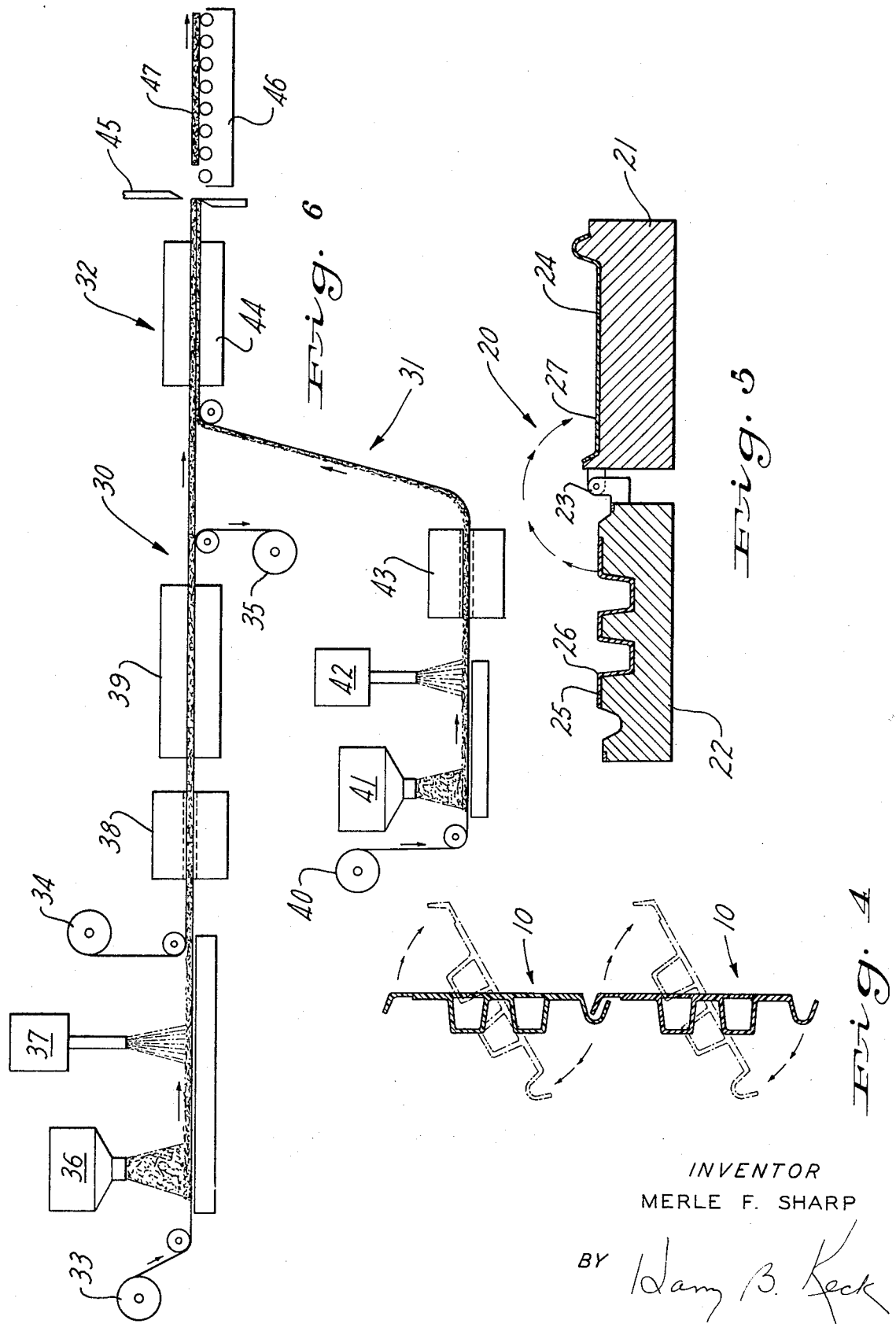

United States Patent Office 3,669,821
Patented June 13, 1972

3,669,821
FIBER-REINFORCED PLASTIC STRUCTURAL MEMBER
Merle F. Sharp, Delmont, Pa., assignor to H. H. Robertson Company, Pittsburgh, Pa.
Filed Aug. 2, 1968, Ser. No. 749,887
Int. Cl. B32b 1/00
U.S. Cl. 161—127
3 Claims

ABSTRACT OF THE DISCLOSURE

Fiber-reinforced plastic structural members are fabricated with at least one lengthwise cell. The members are made from two component elements, each having contiguous surfaces in the assembly which surfaces become coalesced in the integral structural member. One of the components is formed, partially gelled, and before complete gellation, is engaged with the other component which is at that time ungelled. With the two components thus assembled, the overall member is cured to produce a unitary structural member having at least one lengthwise cell. The process is especially useful in producing components for operating louvers.

BACKGROUND OF THE INVENTION (1) Field of the invention

The present invention relates to fiber-reinforced plastic structural members and, more particularly, to such fiber-reinforced plastic structural members having at least one lengthwise cell.

(2) Description of the prior art

Fiber-reinforced plastic articles are manufactured for structural usage in a variety of batch processes, continuous processes and semi-continuous processes. Such articles have been made in flat sheets, continuous strips, semi-continuous strips, arched sheets, corrugated sheets and the like. See U.S. Pats. Re.–24,804; 2,655,978; 2,871,911; 3,265,556. Typically, a mat of fibrous reinforcing material, such as glass fibers, is impregnated with a polymerizable thermosetting resinous substance, such as unsaturated polyester resin, and the impregnated mat is sandwiched between a pair of release membranes, such as cellophane sheets, polyethylene sheets, polyvinyl fluoride sheets, and the like. The sandwich consisting of the release films and the resin-coated fibers is shaped to the desired profile and then is exposed to curing conditions, usually in a heated oven, to accomplish the desired resin cure. Other curing techniques have been proposed, but not commercially applied, e.g., exposure to ultraviolet radiation, to electron beam radiation, and the like. The reinforced plastic structural articles of the prior art consist of single sheet elements. The foregoing description also applies generally to the so-called pultrusion process for fabricating reinforced plastic articles continuously or semi-continuously by employing the fibers in the form of continuous strands or rovings.

SUMMARY OF THE INVENTION

According to the present invention, reinforced plastic members are prepared which are formed from two component elements and which possess at least one lengthwise cell. The present structural members have appreciable flexural strength, and, in one preferred embodiment, are particularly adapted for the construction of operating louvers. The structural members are prepared from two components, at least one of which is corrugated. In the final structural member, the two components are combined in a unitary structure through the contiguous portions thereof which constitute continuous strips which are spaced apart. A first one of the components is formed and subjected to a partial cure to effect a partial gellation of the resin. Before the resin of the first component is cured, the second component is formed with the reinforcing fibers and polymerizable resin is engaged with the partially gelled first component. The resulting assembly is cured while the two components are thus engaged. The two components coalesce along the continuous strips forming a unitary product having a lengthwise cell between each pair of continuous strips.

BRIEF DESCRIPTION OF THE DRAWINGS

FIG. 4 is a cross-section illustration showing the present structural members in an operating louver arrangement;

FIG. 5 is a cross-section illustration of apparatus adapted to prepare the structural member of this invention on a batch basis; and FIG. 6 is a schematic illustration of apparatus adapted to prepare the present structural member on a continuous or semi-continuous basis in strip form.

DESCRIPTION OF THE PREFERRED EMBODIMENT(S)

Figure 1:
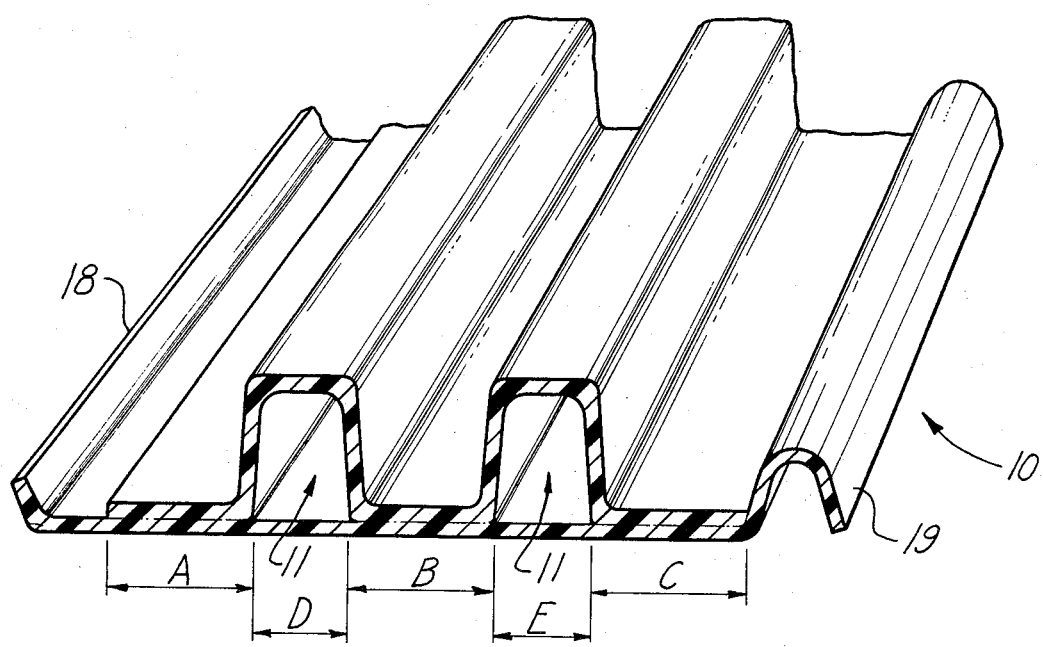
FIG. 1 is a fragmentary perspective illustration of a structural member of this invention.
Figure 2:
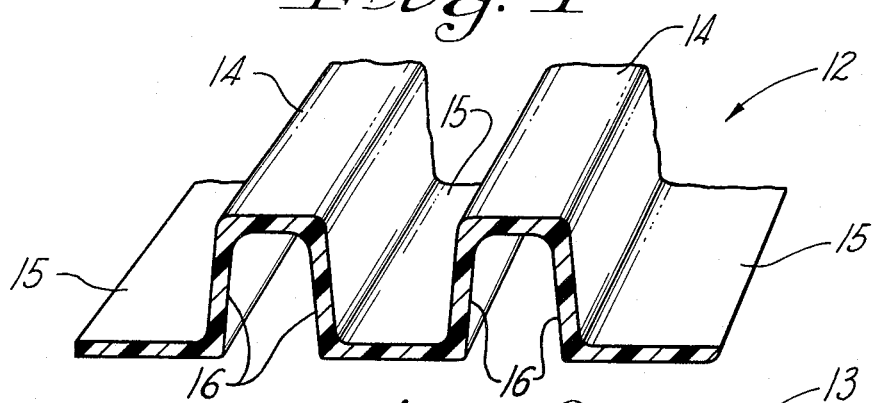
FIG. 2 is a fragmentary perspective illustration of one of the component elements of the structural member of this invention.
Figure 3:
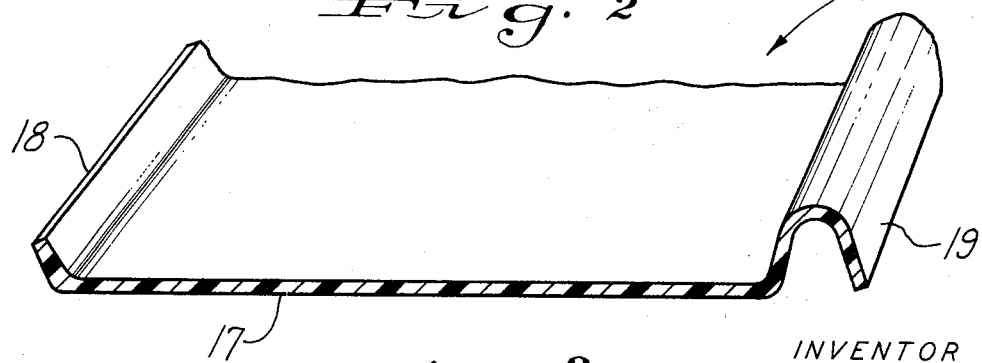
FIG. 3 is a fragmentary perspective illustration of the other component element of the structural member.

FIG. 1 illustrates a structural member 10 in accordance with the present invention, having two lengthwise cells 11. The structural member 10 is fabricated from two component elements including a corrugated element 12 (FIG. 2) and a generally flat element 13 (FIG. 3). The corrugated element 12 includes crests 14, valleys 15 and connecting webs 16. The essentially flat element 13 has a central portion 17 and lateral flanges 18, 19. The structural element 10 has an especial utility in operating louvers as indicated in FIG. 4 wherein a plurality of the structural elements 10 is assembled in essentially parallel relation, each in a rotatable manner, whereby each element can be rotated from the solid-line position indicated in FIG. 4 to the dotted line position seen in FIG. 4. As operating louver elements, the present structural members 10 permit ingress of air and light into a building on which the operating louver is mounted. The closed position louver (solid-line, FIG. 4) resists impact of the type which can be anticipated in typhoons, hurricanes, tornadoes, where atmospheric-borne debris can be expected to be projected against the louvers. By providing enclosed lengthwise cells within the structures, sufficient flexural strength can be achieved to enable the elements to be used in relatively long span louver installations.

METHOD OF ASSEMBLY

A typical apparatus is illustrated in FIG. 5 for the batch fabrication of the present structural members. A hinged mold 20 includes a bottom element 21, a top element 22 and a hinge 23. The upper surface 24 of the bottom element 21 conforms to the desired shape of the component 13. The upper surface 25 of the top mold element 22 conforms to the shape of the component 12.

The upper surface 25 is coated with a mold release agent of any suitable type and a layer 26 of fibrous reinforcing material, such as randomly oriented glass fibers, is applied to the surface 25 along with an impregnating quantity of a polymerizable thermosetting resinous substance, such as unsaturated polyester resin. The layer 26 may comprise a section of glass fiber mat, or may be a glass fiber preform mat or a section of woven glass fiber fabric, for example. The resinous substance in the layer 26 is allowed to become partially gelled. A similar layer 27 of fibrous reinforcing substances and polymerizable resinous materials is applied to the upper surface 24 of the mold element 21. Before the resin of the layer 27 commences gellation, the partially gelled corrugated element in the form of the layer 26 of impregnated fibers is engaged with the layer 27 of impregnated fibers by rotating the top mold element 22 about the hinge 23. Because of the partial gellation of the resin in the layer 26, the shape of the impregnated fibers is retained. The layers 26 and 27 are engaged over contiguous surfaces and the assembled layers coalesce into a unitary structure. As thus assembled, the structural member is subjected to a complete cure by heat, by electron bombardment, by ultraviolet radiation exposure, and the like. A suitable catalyst or polymerization initiator is included in the layers 26, 27 to correspond with the selected curing system. The mold 20 may be opened with the resin impregnated fibers layer 26 being retained in engagement with the resin impregnated fibers layer 27 during the final stages of the cure of the structural member. While the structural member is experiencing its final cure, a new layer 26 of impregnated fibers may be applied to the cleaned top mold element 22 to commence the fabrication of a next structural member.

The present structural members can be fabricated on a continuous or semi-continuous basis with apparatus of the type illustrated in FIG. 6. The apparatus includes a first conveyor line 30 and a second conveyor line 31 which merge together into a third conveyor line 32. The first component is formed in the first conveyor line 30 which includes reels 33, 34 of release membrane, and a take-up reel 35 for one of the expended release membranes. The first conveyor line 30 also includes a fiber dispensing station 36, a resin dispensing station 37, a first component former 38 and a partial curing region, such as an over, 39.

The second conveyor line includes a reel 40 for a release membrane, a fiber dispensing station 41, a resin dispensing station 42 and a second component former 43. The third conveyor line 32 includes a curing station 44, a product cutting station 45 and a product delivery station 46. Preferably unsaturated polyester resins are provided in the resin dispensing stations 37, 42. Typical forming elements 38, 43 include forming shoes defining the desired sandwich profile. The shoes preferably are placed on a table which is equipped with vacuum ports to retain the assembly in a close-forming engagement with the forming shoes.

Customarily the release membrane is a film of cellophane which is drawn from the reel 33 along the conveyor line 30 and is recovered in the reel 35. A supply of chopped reinforcing fibers is delivered onto the membrane from the fiber dispensing station 36 in a manner illustrated, for example, in U.S. Pat. 2,927,623. Alternatively, the layer of reinforcing fibers may be deposited as a woven glass fiber fabric or a preformed mat of glass fibers drawn from a reel of such fibers (not shown in FIG. 6) in the manner illustrated, for example, in U.S. Pat. 3,291,672. A quantity of polymerizable resin is applied to the reinforcing fibers from a resin dispensing station 37 in the form of a spray or, alternatively, in the form of a liquid bath similar to that illustrated in the aforementioned U.S. Pat. 3,291,672. A top-side release membrane is applied above the imprenated reinforcing fibers from a reel 34 to form a laminating sandwich. The laminating sandwich is delivered through a forming unit 38, which may be of the type illustrated in U.S. Pats. 3,245,121 or 2,927,623, for example. The suitably profiled laminating sandwich is delivered from the forming unit 38 to a partial curing region, which may be an oven 39 wherein partial gellation of the impregnating resin is achieved while the laminating sandwich is maintained in the geometric form established by the component forming unit 38. The preformed, partially gelled, laminating sandwich is delivered to the third conveyor line 32 after the bottom release membrane has been removed by take-up on the reel 35.

The second conveyor line 31 employs a release membrane which is drawn from the reel 40 and is coated with reinforcing fibers from a fiber dispensing station 41. The fibers are impregnated with a resin from a resin dispensing station 42 and, without the benefit of an additional release membrane, the impregnated fibers are shaped to desired form in a forming unit 43. Thereupon, without deliberate gellation, the preformed, essentially ungelled impregnated fibers are delivered to the third conveyor line 32.

At the junction of the conveyor lines 30 and 31, the preformed, partially gelled laminating sandwich from the first conveyor line 30 is engaged with the preformed, essentially ungelled resin impregnated fibers from the second conveyor line 31 and the resulting assembly is delivered through a curing station 44, such as an oven, and delivered to a cut-off station 45, where the assembled structural strip is cut to the desired lengths for the particular application and sent to a product delivery station 46. The resulting cured cut-to-length structural members 47 are delivered for storage or shipment.

The structural members 47 have at least one lengthwise cell which achieves significant flexural strength for the units. The first component is a laminate having at least two valleys 15 (FIG. 2) which merge into the central portion 17 of the second component (FIG. 3) over continuous strips A, B, C (FIG. 1) which are spaced apart by continuous regions D, E (FIG. 1) which form part of the surface of the enclosed lengthwise cells.

I claim:

1. A two-component laminated article having a glass fiber-reinforced plastic flat base member with edge flanges and a glass fiber-reinforced plastic corrugated member having at least one crest, at least two valleys and a pair of webs joining the said crest with the valleys, the members being bonded between the said valleys and a central region of the said flat member.

2. A louver blade comprising the laminated article of claim 1 wherein
   the said flat base member has an elongated central portion and a flange along each side edge, and
   the said corrugated element has at least one crest, at least two valleys and at least one pair of webs joining the sides of said crest to the said valleys; and
   the said pair of webs extend lengthwise along the said central portion on each side of a continuous region thereof;
   the said louver blade has at least one lengthwise cell defined by
      the said crest,
      a said pair of webs, and
      the said continuous region of the said central portion.

3. The louver blade of claim 2 having two said lengthwise cells.

References Cited

UNITED STATES PATENTS 2,102,937   12/1937   Baver _____ 156—210 X
2,737,227   3/1956   Brummel _____ 156—210 X BENJAMIN R. PADGETT, Primary Examiner S. J. LECHERT, Jr., Assistant Examiner U.S. Cl. X.R.

161—133, 139; 156—292, 210; 52—625